United States Patent
Sun et al.

(10) Patent No.: US 12,555,955 B2
(45) Date of Patent: Feb. 17, 2026

(54) VERTICALLY MOUNTABLE SNAP FIT BRACKET FOR ELECTROLYTIC CAPACITORS

(71) Applicant: Sandisk Technologies, Inc., Milpitas, CA (US)

(72) Inventors: Shiqiang Sun, Shenzhen (CN); Lihwa Fong, Irvine, CA (US); Ning Ye, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 283 days.

(21) Appl. No.: 18/362,157

(22) Filed: Jul. 31, 2023

(65) Prior Publication Data

US 2024/0413573 A1    Dec. 12, 2024

Related U.S. Application Data

(60) Provisional application No. 63/506,708, filed on Jun. 7, 2023.

(51) Int. Cl.
| | | |
|---|---|---|
| *H01R 13/627* | (2006.01) | |
| *H01G 2/06* | (2006.01) | |
| *H01G 9/02* | (2006.01) | |
| *H01G 9/08* | (2006.01) | |

(52) U.S. Cl.
CPC ......... *H01R 13/6273* (2013.01); *H01G 2/065* (2013.01); *H01G 9/02* (2013.01); *H01G 9/08* (2013.01)

(58) Field of Classification Search
CPC . H01G 2/065; H01G 9/02; H01G 9/08; H01R 13/6273

USPC .......................................... 439/352; 361/500
See application file for complete search history.

(56) References Cited

U.S. PATENT DOCUMENTS

| | | | | |
|---|---|---|---|---|
| 7,969,713 | B2 * | 6/2011 | Matsuoka | H01G 9/012 |
| | | | | 361/538 |
| 11,444,394 | B2 * | 9/2022 | Stremersch | H01G 9/008 |
| 11,581,136 | B2 * | 2/2023 | Hadwan | H01G 2/106 |
| 11,856,700 | B2 * | 12/2023 | Ryu | H05K 1/182 |
| 2010/0124036 | A1 * | 5/2010 | Schneider | H05K 7/12 |
| | | | | 361/782 |
| 2019/0006101 | A1 * | 1/2019 | Matsumae | H01G 9/08 |
| 2024/0412922 | A1 * | 12/2024 | Sun | H01G 2/06 |

* cited by examiner

*Primary Examiner* — Tulsidas C Patel
(74) *Attorney, Agent, or Firm* — DENTONS Durham Jones Pinegar

(57) ABSTRACT

A snap fit bracket for an electrolytic capacitor is vertically mounted within an opening defined by a substrate. The bracket includes four sidewalls that form a perimeter. A first flange extends from one sidewall and forms a first ledge that sits on a top surface of the substrate when the bracket is mounted within the opening defined by the substrate. A second flange extends from another sidewall and forms a second ledge that sits on the top surface of the substrate when the bracket is mounted within the opening defined by the substrate. A fastener extends from two or more of the sidewalls. A top surface of each fastener contacts a bottom surface of the substrate when the bracket is mounted within the opening defined by the substrate. After vertically mounting the bracket within the substrate, the capacitor disposed within the bracket is horizontally mounted with respect to the PCB.

20 Claims, 5 Drawing Sheets

VERTICALLY MOUNTABLE SNAP FIT BRACKET FOR ELECTROLYTIC CAPACITORS

CROSS-REFERENCE TO RELATED APPLICATIONS

The present application claims priority to U.S. Provisional Application 63/506,708 entitled "VERTICALLY MOUNTABLE SNAP FIT BRACKET FOR ELECTROLYTIC CAPACITORS", filed Jun. 7, 2023, the entire disclosure of which is hereby incorporated by reference in its entirety.

BACKGROUND

Capacitors are typically included with various solid-state drives (SSDs) and/or enterprise solid-state drives (eSSDs). Capacitors store and discharge electrical energy and are used to provide backup power in case of unexpected power outages and/or system failures. Capacitors may also help reduce the likelihood of voltage spikes.

Given these benefits, it is desirable to include high-capacity capacitors with SSDs and other semiconductor packages. However, some high-capacity capacitors are typically coupled to a substrate of the SSD using laser soldering, which can be a time-intensive and/or a costly process.

In other examples, some high-capacity capacitors are surface mounted to the substrate. For example, a surface mount technology (SMT) grade capacitor may be placed into a bracket. The bracket is mounted to the substrate and a reflow soldering process is used to secure the bracket to the substrate. Leads of the SMT grade capacitor may also be welded to one or more pads on the surface of the substrate. However, SMT grade capacitors are expensive.

Accordingly, it would be beneficial to surface mount high-capacity capacitors to a substrate without using a laser soldering process.

SUMMARY

The present application describes a bracket for an electrolytic capacitor. The bracket includes various features that enable the bracket to be vertically mounted to, and subsequently secured within, an opening defined by a substrate or a printed circuit board (PCB). In an example, the bracket and the electrolytic capacitor are secured within the opening defined by the substrate without using a reflow soldering process and/or a laser soldering process. As will be discussed in detail below, although the bracket is vertically mounted to the substrate or PCB, the capacitor itself is horizontally mounted with respect to the PCB.

In an example, the bracket includes four different sidewalls that form a perimeter, or a body, of the bracket. The sidewalls of the bracket also define an opening that receives an electrolytic capacitor. A first flange extends from one sidewall and forms a first ledge that sits on a top surface of a PCB or substrate to provide support for the bracket when the bracket is vertically mounted within the opening defined by the substrate. A second flange extends from another sidewall and forms a second ledge that sits on the top surface of the substrate to provide support for the bracket when the bracket is vertically mounted within the opening defined by the substrate. One or more fasteners extends from one or more of the sidewalls. A top surface of each fastener contacts a bottom surface of the substrate when the bracket is vertically mounted within the opening defined by the substrate, which further secures the bracket within the opening defined by the substrate.

Accordingly, the present application describes a bracket for mounting a capacitor to a substrate. In an example, the bracket includes a first sidewall, a second sidewall opposite the first sidewall, a proximal wall extending between a proximal end of the first sidewall and a proximal end of the second sidewall and a distal wall extending between a distal end of the first sidewall and a distal end of the second sidewall. In an example, the first sidewall, the second sidewall, the proximal wall and the distal wall define an opening. A first flange extends from the proximal wall and forms a first ledge that contacts a surface of the substrate when the bracket is received in an opening defined by the substrate. A second flange extends from the distal wall and forms a second ledge that contacts the surface of the substrate when the bracket is received in the opening defined by the substrate. The bracket also includes a first snap fit fastener extending from the proximal wall and a second snap fit fastener extending from the distal wall.

A semiconductor package is also described. In an example, the semiconductor package includes a substrate that defines an opening. The semiconductor package also include a bracket for a capacitor provided within the opening. In an example, the bracket includes a first sidewall, a second sidewall, a proximal wall extending between a proximal end of the first sidewall and a proximal end of the second sidewall and a distal wall extending between a distal end of the first sidewall and a distal end of the second sidewall. In an example, the first sidewall, the second sidewall, the proximal wall and the distal wall define a bracket opening. A first flange extends from the proximal wall and forms a first ledge that contacts a surface of the substrate when the bracket is received in the opening defined by the substrate. A second flange extends from the distal wall and forms a second ledge that contacts the surface of the substrate when the bracket is received in the opening defined by the substrate. A first snap fit fastener extends from the proximal wall and a second snap fit fastener extends from the distal wall.

The present application also describes a bracket for mounting a capacitor to a substrate. In an example, the bracket includes a body defining a bracket opening. A first support means is provided on a proximal end of the body and a second support means is provided on a distal end of the body. In an example, the first support means and the second support means contact a top surface of the substrate when the bracket is placed in an opening defined by the substrate. A fastening means secures the bracket within the opening defined by the substrate. In an example, the fastening means includes a surface that contacts a bottom surface of the substrate when the bracket is placed in the opening defined by the substrate.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
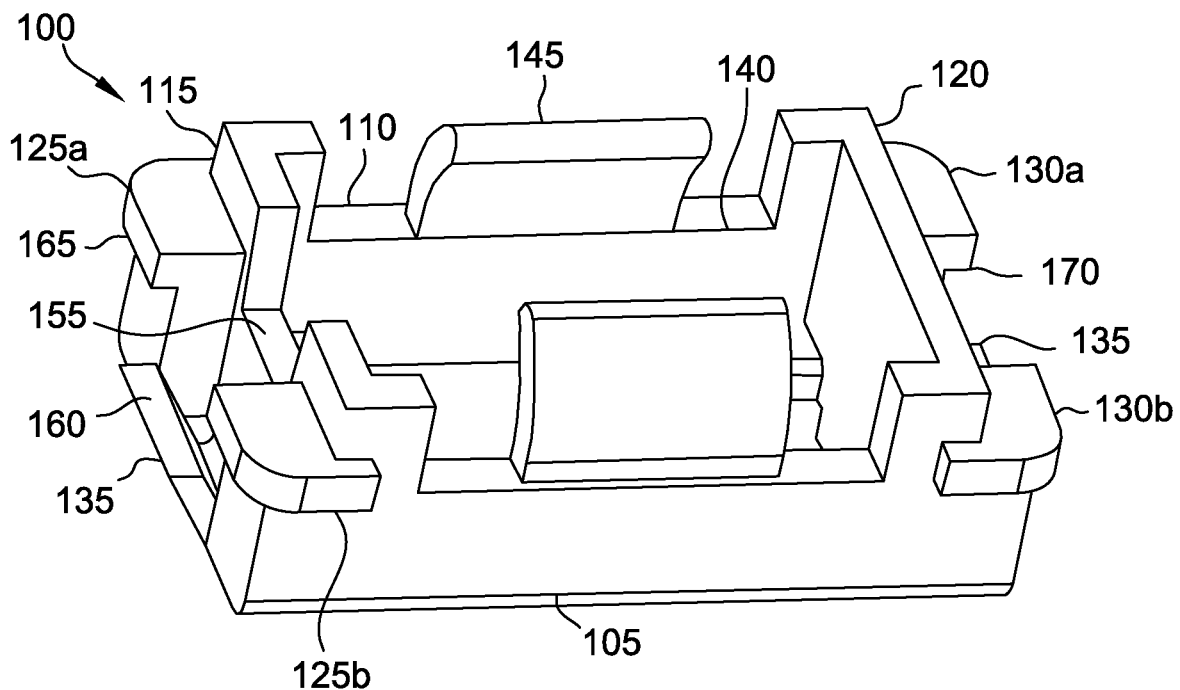
FIG. 1A illustrates a top view of bracket for an electrolytic capacitor according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. The following detailed description is therefore not to be taken in a limiting sense, and the scope of the present disclosure is defined by the appended claims and their equivalents.

Capacitors, such as electrolytic capacitors (or e-caps), are typically included with various solid-state drives (SSDs) and/or enterprise solid-state drives (eSSDs). Capacitors store and discharge electrical energy and may be used to provide backup power in case of unexpected power outages and/or system failures. For example, a SSD constantly writes and reads data from memory cells. If there is a sudden loss of power, data that is being written or read may be lost or corrupted. However, using a capacitor, an SSD can maintain power long enough to complete any outstanding read and/or write operations.

Capacitors may also help reduce the likelihood of voltage spikes or other disturbances. As a result, a lifespan of the SSD may be prolonged. Give these benefits, it may be beneficial to include high-capacity, high-voltage capacitors, such as electrolytic capacitors, in various semiconductor packages.

However, some electrolytic capacitors, such as liquid electrolytic capacitors, may not be easily coupled to a substrate. For example, liquid electrolytic capacitors are typically coupled to a substrate using a laser soldering process or a wave soldering process. However, laser soldering or wave soldering is an expensive and time-consuming process.

In another example, an electrolytic capacitor may be mounted to a substrate using a reflow soldering process. In this example, the electrolytic capacitor is typically placed in a capacitor holder and the electrolytic capacitor is soldered to the capacitor holder. The capacitor holder, along with the electrolytic capacitor, is then soldered to the substrate using a reflow soldering process. However, this solution requires use of a surface mount technology (SMT) grade capacitor, which can be expensive. Additionally, two different soldering processes are needed to mount the electrolytic capacitor to the substrate.

In order to address the above, the present application describes a snap fit bracket for an electrolytic capacitor. Although an electrolytic capacitor is specifically described, the snap fit bracket may be used for any type of capacitor. In another example, the snap fit bracket described herein may be used for any number of computing components that are mounted to a substrate or a printed circuit board (PCB).

In an example, the snap fit bracket includes various features that enable the snap fit bracket to be vertically coupled to, and subsequently secured within, an opening defined by a substrate or a PCB. The snap fit bracket and the electrolytic capacitor may be secured within the opening defined by the substrate without using a reflow soldering process and/or a laser soldering process as is common in current mounting solutions.

In an example, the bracket includes four different sidewalls that form a perimeter, or a body, of the bracket. The sidewalls of the bracket also define an opening that receives an electrolytic capacitor. A first flange extends from one sidewall and forms a first ledge that sits on a top surface of the substrate to support the bracket when the bracket is vertically mounted within the opening defined by the substrate. A second flange extends from another sidewall and forms a second ledge that sits on the top surface of the substrate to support the bracket when the bracket is vertically mounted within the opening defined by the substrate. A fastener also extends from one or more of the sidewalls. A top surface of the fastener contacts a bottom surface of the substrate when the bracket is vertically mounted within the opening defined by the substrate.

Once the snap fit bracket and the electrolytic capacitor have been secured within the opening, a hot bar soldering process (or other soldering process) may be used to electrically couple one or more leads of the electrolytic capacitor to one or more pads on a surface of the substrate.

Accordingly, many technical benefits may be realized including, but not limited to, increasing the speed and efficiency of mounting electrolytic capacitors to a substrate, replacing a costly laser soldering process with a less expensive hot bar soldering process, and reducing Z-height requirements by enabling the snap fit bracket to be vertically mounted within an opening defined by the substrate or PCB. As will be understood by those of skill in the art, vertically mounting the bracket means dropping the bracket from above the PCB and into the opening defined in the PCB. The e-cap disposed within the bracket, however, is horizontally mounted with respect to the PCB.

These and other examples will be explained in greater detail below with respect to FIG. 1-FIG. 3B.

FIG. 1A illustrates a top view of bracket 100 for an electrolytic capacitor according to an example. The bracket 100 includes various features and/or mechanisms that are used to vertically mount and secure the bracket 100, and an electrolytic capacitor positioned within the bracket 100, to an opening defined by a substrate. Although specific measurements of portion of the bracket 100 are given below, the bracket 100 may be shaped and/or sized to fit any number of different capacitors.

In an example, the bracket 100 includes a first sidewall 105 and a second sidewall 110 opposite the first sidewall 105. The first sidewall 105 and the second sidewall 110 may have a length of approximately fifteen millimeters (mm), although other lengths are contemplated. In addition, the first sidewall 105 and the second sidewall 110 may have a height of approximately three mm or less, although other heights are contemplated.

In some examples, a first portion (or first portions) of the first sidewall 105 and/or a first portion (or first portions) of the second sidewall 110 may have a first height while a second portion of the first sidewall 105 and a second portion of the second sidewall 110 have a second, different height. For example, a proximal and/or a distal side of the first sidewall 105 and a proximal and/or distal side of the second sidewall 110 may have a first height while a middle portion of the first sidewall 105 and a middle portion of the second sidewall 110 have a different height.

The bracket 100 may also include a proximal wall 115 and a distal wall 120. The proximal wall 115 may extend between the first sidewall 105 and the second sidewall 110. For example, the proximal wall 115 may extend between the first sidewall 105 and the second sidewall 110 at or near a proximal end of each of the first sidewall 105 and the second sidewall 110. Likewise, the distal wall 120 may extend between the first sidewall 105 and the second sidewall 110. In an example, the distal wall 120 may extend between the first sidewall 105 and the second sidewall 110 at or near a distal end of each of the first sidewall 105 and the second sidewall 110. The proximal wall 115 and the distal wall 120 may have a length of approximately nine mm although other lengths are contemplated.

In an example, a first portion (or first portions) of the proximal wall 115 and/or a first portion (or first portions) of the distal wall 120 may have a first height while a second portion of the proximal wall 115 and a second portion of the distal wall 120 have a second, different height. For example, a proximal side and/or a distal side of the proximal wall 115 may have a first height while a middle portion of the proximal wall 115 has a different height. As shown in FIG. 1A, the middle portion of the proximal wall 115 defines an aperture 155 that enables one or more leads of an electrolytic capacitor to pass therethrough when the electrolytic capacitor is placed within an opening 140 defined by the bracket 100.

The first sidewall 105, the second sidewall 110, the proximal wall 115 and the distal wall 120 may form a perimeter or a body of the bracket 100. Additionally, the first sidewall 105, the second sidewall 110, the proximal wall 115 and the distal wall 120 define the opening 140 that receives the electrolytic capacitor.

In an example, the opening 140 extends from a top surface of each of the first sidewall 105, the second sidewall 110, the proximal wall 115 and the distal wall 120 to a bottom surface of each of the first sidewall 105, the second sidewall 110, the proximal wall 115 and the distal wall 120. In another example, the opening 140 may extend from the top surface of each of the first sidewall 105, the second sidewall 110, the proximal wall 115 and the distal wall 120 to a floor or base that extends from the bottom surface of each of the first sidewall 105, the second sidewall 110, the proximal wall 115 and the distal wall 120.

In an example, the bracket 100 is vertically mountable to an opening defined by a substrate. In order to secure the bracket 100 to a top surface of the substrate, a first flange 125a extends from the proximal wall 115 to form a ledge 165 and a second flange 125b extends from the proximal wall 115 to form another ledge 165. Each ledge 165 may provide support for the bracket 100 when the bracket is vertically mounted to the substrate.

In an example, the first flange 125a extends from a first portion of the proximal wall 115 to a first portion of the second sidewall 110. The first flange 125a may include a rounded edge that extends between the first portion of the proximal wall 115 and the first portion of the second sidewall 110. Likewise, the second flange 125b extends from a second portion of the proximal wall 115 to a first portion of the first sidewall 105. The second flange 125b may include a rounded edge that extends between the second portion of the proximal wall 115 and the first portion of the first sidewall 105.

Portions of the first flange 125a and/or the second flange 125b, although forming ledges 165, may extend from a bottom surface of the proximal wall 115 to the ledge 165. As such, a thickness of the proximal wall 115 may be greater in areas from which the first flange 125a and the second flange 125b extend compared to other portions of the proximal wall 115.

The distal wall 120 may also include one or more flanges. In an example, a third flange 130a extends from the distal wall 120 to form a ledge 170 and a fourth flange 130b extends from the distal wall 120 to form another ledge 170. Each ledge 170 may provide support for the bracket 100 when the bracket is vertically mounted to the substrate.

In an example, the third flange 130b extends from a first portion of the distal wall 120 to a second portion of the second sidewall 110. The third flange 130a may include a rounded edge that extends between the first portion of the distal wall 120 and the second portion of the second sidewall 110. Likewise, the fourth flange 130b extends from a second portion of the distal wall 120 to a second portion of the first sidewall 105. The fourth flange 130b may include a rounded edge that extends between the second portion of the distal wall 120 and the second portion of the first sidewall 105.

Portions of the third flange 130a and/or the second flange 130b, although forming ledges 170, may extend from a bottom surface of the distal wall 120 to the ledge 170. As such, a thickness of the distal wall 120 may be greater in areas from which the third flange 130a and the fourth flange 130b extend compared to other portions of the distal wall 120.

In an example, a bottom surface of the ledges 165 formed by the first flange 125a and the second flange 125b contact a top surface of the substrate when the bracket 100 is vertically mounted to the substrate. Likewise, a bottom surface of the ledges 170 formed by the third flange 130a and the fourth flange 130b contact the top surface of the substrate when the bracket 100 is vertically mounted to the substrate. As such, the ledges 165 and the ledges 170 provide support for the bracket 100 when the bracket is placed within the opening defined by the substrate.

The bracket 100 also includes a fastener 135. A fastener 135 may extend from the proximal wall 115 and/or from the distal wall 120. The fastener 135 may be a snap fit fastener. In an example, the fastener 135 is "v-shaped", but other shapes are contemplated. A portion of the fastener 135 may collapse, or move from a first position toward a second position, in response to the bracket 100 being vertically mounted to the opening defined by the substrate. The portion of the fastener 135 that moves from the first position toward the second position moves back to the first position once the bracket 100 has been vertically mounted to the opening defined by the substrate (e.g., when the ledges 165 and the ledges 170 contact the top surface of the substrate).

The fastener 135 also includes a top surface 160. The top surface 160 may be substantially planar and may contact a bottom surface of the substrate when the bracket 100 is vertically mounted to the opening defined by the substrate. Thus, the top surface 160 of the fastener 135, along the ledges 165 and the ledges 170, are used to secure the bracket 100 within the opening defined by the substrate.

The bracket 100 may also include one or more ridges 145 that extend from a top surface of each sidewall. For example, a first ridge 145 may extend from the top surface of the first sidewall 105 and a second ridge 145 may extend from the top surface of the second sidewall 115. Each ridge 145 may be rounded or otherwise have a shape/contour that matches the shape/contour of the electrolytic capacitor.

In an example, each ridge 145 may be flexible or made from a flexible material that enables the ridge 145 to move from a first position to a second position (e.g., a position that expands an opening or a distance between opposing ridges 145). When the ridges 145 are in the second position, the electrolytic capacitor may be placed within the opening 140. Once the electrolytic capacitor has been placed within the opening 145, each ridge 145 may move from the second position toward the first position to secure the electrolytic capacitor within the opening 140.

Figure 1B:
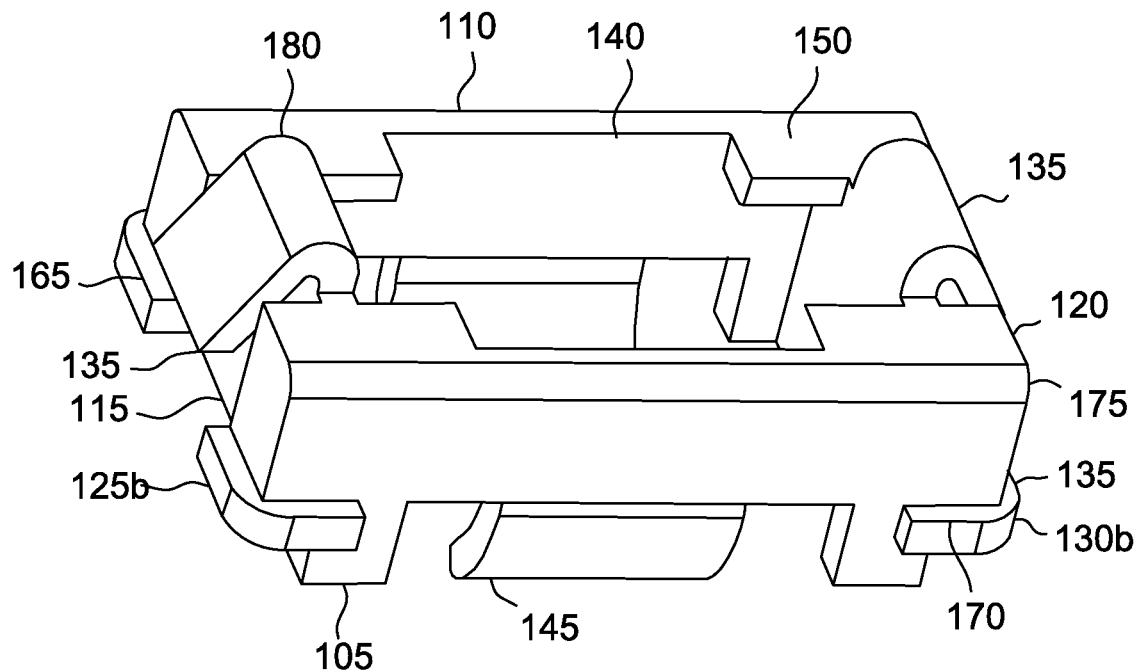
FIG. 1B illustrates a bottom view of the bracket of FIG. 1A according to an example.

FIG. 1B illustrates a bottom view of the bracket 100 of FIG. 1A according to an example. As shown in FIG. 1B, the opening 140 extends from a top surface of each of the first sidewall 105, the second sidewall 110, the proximal wall 115 and the distal wall 120 to a bottom surface of each of the first sidewall 105, the second sidewall 110, the proximal wall 115 and the distal wall 120. However, in an example, one or more shelves 150 may extend from one or more inner surfaces of the first sidewall 105, the second sidewall 110, the proximal wall 115 and/or the distal wall 120. Each of the shelves 150 may be shaped to support the electrolytic capacitor that is received in the opening 140.

For example, a top surface, or a portion of the top surface, of each shelf 150 may be rounded or otherwise have a shape/contour that matches the shape/contour of the electrolytic capacitor. Although four shelves 150 are shown, any number of shelves 150 may comprise the bottom surface of the bracket 100.

As previously indicated, in an example, the fastener 135 is a v-shaped snap fit fastener. As such, the fastener 135 may have a rounded portion 180. Although a rounded portion is shown, any shape that enables a portion of the fastener to move from a first position to a second position, is contemplated. The rounded portion 180 may extend beyond the bottom surface of the various walls and/or shelves 150 of the bracket 100. The rounded portion 180 may also enable the fastener 135 to flex and/or bend as the fastener 135 contacts an edge of the substrate within the opening defined by the substrate.

In an example, the bracket 100 may also include a rounded edge 175 that extends between the first sidewall 105 and a bottom surface of the bracket 100 (or a bottom surface of the one or more shelves 150 that extend from the first sidewall 105). Likewise, a rounded edge 175 may extend between the second sidewall 110 and a bottom surface of the bracket 100 (or a bottom surface of the one or more shelves 150 that extend from the second sidewall 110). The rounded edge 175 may enable the bracket 100 to be more easily vertically mounted to the substrate when compared with edges of other shapes.

Figure 2A:
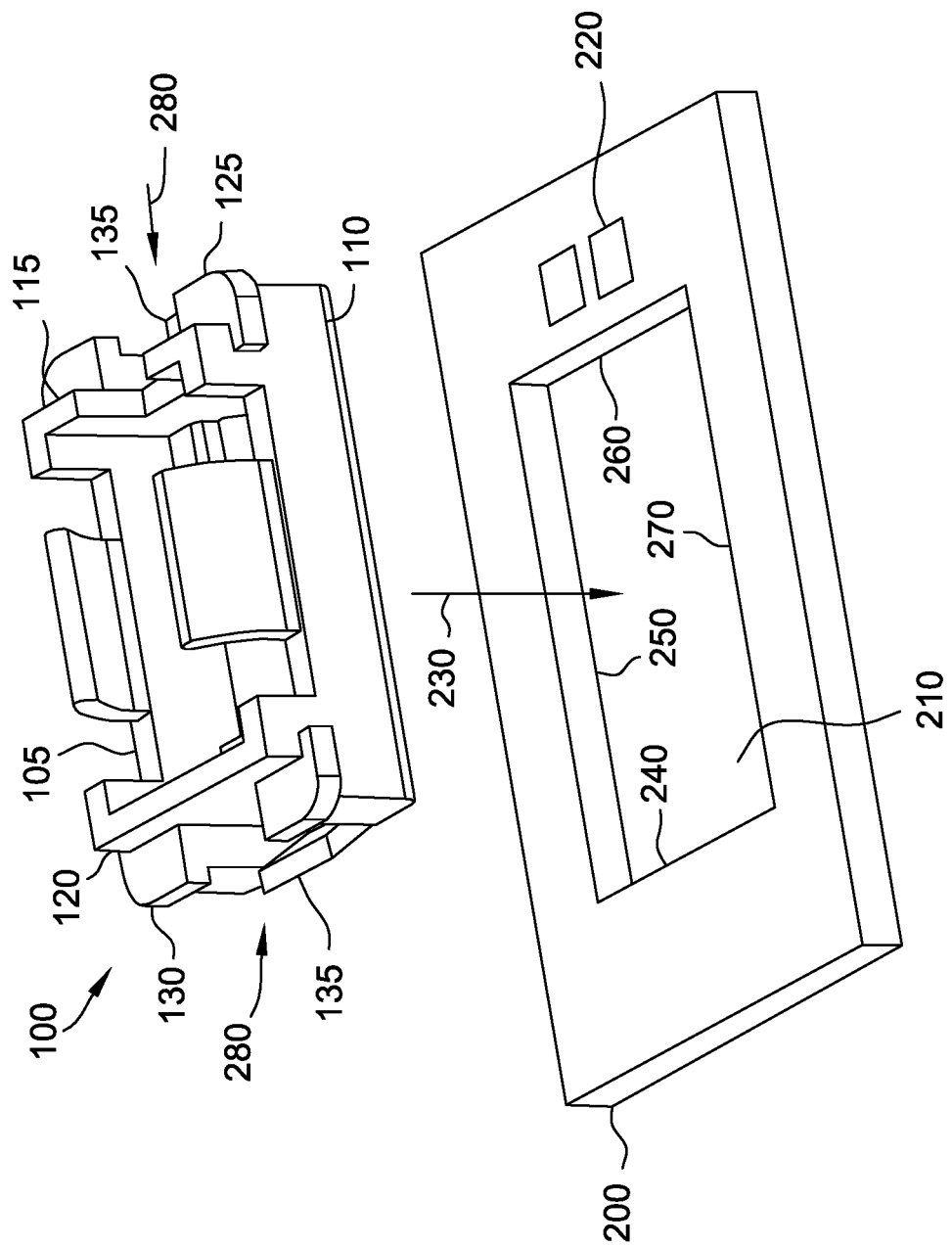
FIG. 2A illustrates how the bracket of FIG. 1 is vertically mounted to an opening defined by a substrate according to an example.

FIG. 2A illustrates the bracket 100 of FIG. 1 being vertically mounted to a substrate 200 according to an example. In an example, the substrate 200 defines an opening 210. The opening 210 may have a size and/or a shape that is similar to, or otherwise conforms with, the shape of the bracket 100. In an example, the bracket 100 is vertically mounted to the substrate 200 by inserting the bracket 100 into the opening 210 of the substrate 200 by positioning the bracket 100 above (or below) the opening 210 and causing the bracket 100 to move downward (or upward) with respect to the opening 210 until the bracket 100 is secured within the opening 210. While the bracket 100 is vertically mounted to the substrate 200, an electrolytic capacitor within the bracket 100 will be mounted horizontally with respect to the substrate 200.

The substrate 200 may also include one or more pads 220 coupled to a surface of the substrate 200. The pads 220 may be positioned at or near a distal side of the opening 210. As will be shown and described in greater detail herein with respect to FIG. 3A and FIG. 3B, one or more leads of an electrolytic capacitor may be electrically and/or communicatively coupled to the pads 220.

In an example, the substrate 200 has multiple inner edges within the opening 210. For example, the opening 210 may define a first inner edge 240, a second inner edge 250, a third inner edge 260 and a fourth inner edge 270. In an example, the fastener 135 on the distal wall 120 of the bracket 100 may contact the first inner edge 240 and the fastener 135 on the proximal wall 115 of the bracket 100 may contact the third inner edge 260 when the bracket 100 is vertically mounted (e.g., in the direction of arrow 230) to the opening 210 defined by the substrate 200.

Figure 2B:
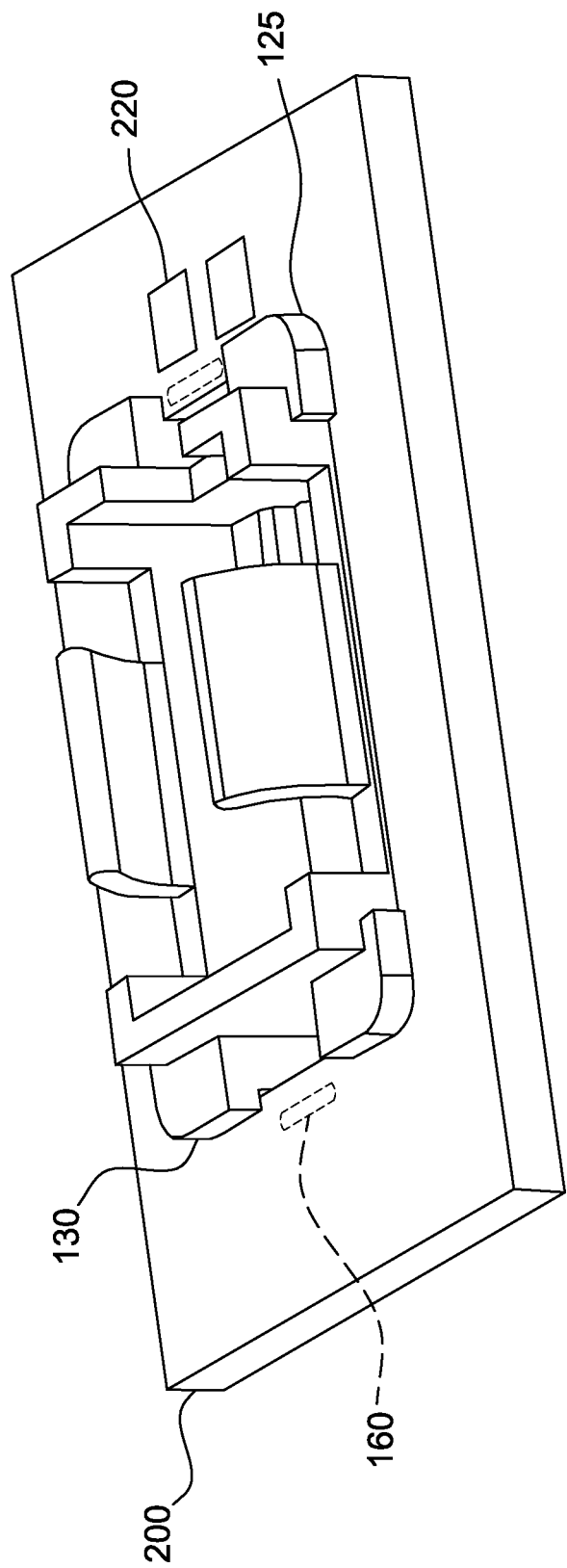
FIG. 2B illustrates the bracket of FIG. 1 being vertically mounted to an opening defined by a substrate according to an example.

In an example, when each fastener 135 contacts the first inner edge 240 of the substrate 200 within the opening 210 and the third inner edge 260 of the substrate 200 within the opening 210, each fastener 135 (or a portion of each fastener 135) may move from a first position toward a second position (e.g., in the direction of arrows 280). Once a top surface 160 of each fastener 135 reaches the bottom surface of the substrate 200 (and/or the bottom surfaces of the ledges 165 and the ledges 170 (FIG. 1A-FIG. 1B) reach the top surface of the substrate 200), each fastener 135 (or the portion of each fastener 135) moves from the second position back towards the first position and the bracket 100 is secured within the opening 210 such as shown in FIG. 2B.

In an example, the bracket 100 may be removed from the opening 210 in a similar manner in which the bracket 100 was positioned within the opening 210. For example, each fastener 135 may be moved from the first position toward the second position. The bracket 100 may then be vertically lifted out of the opening 210.

Figure 3A:
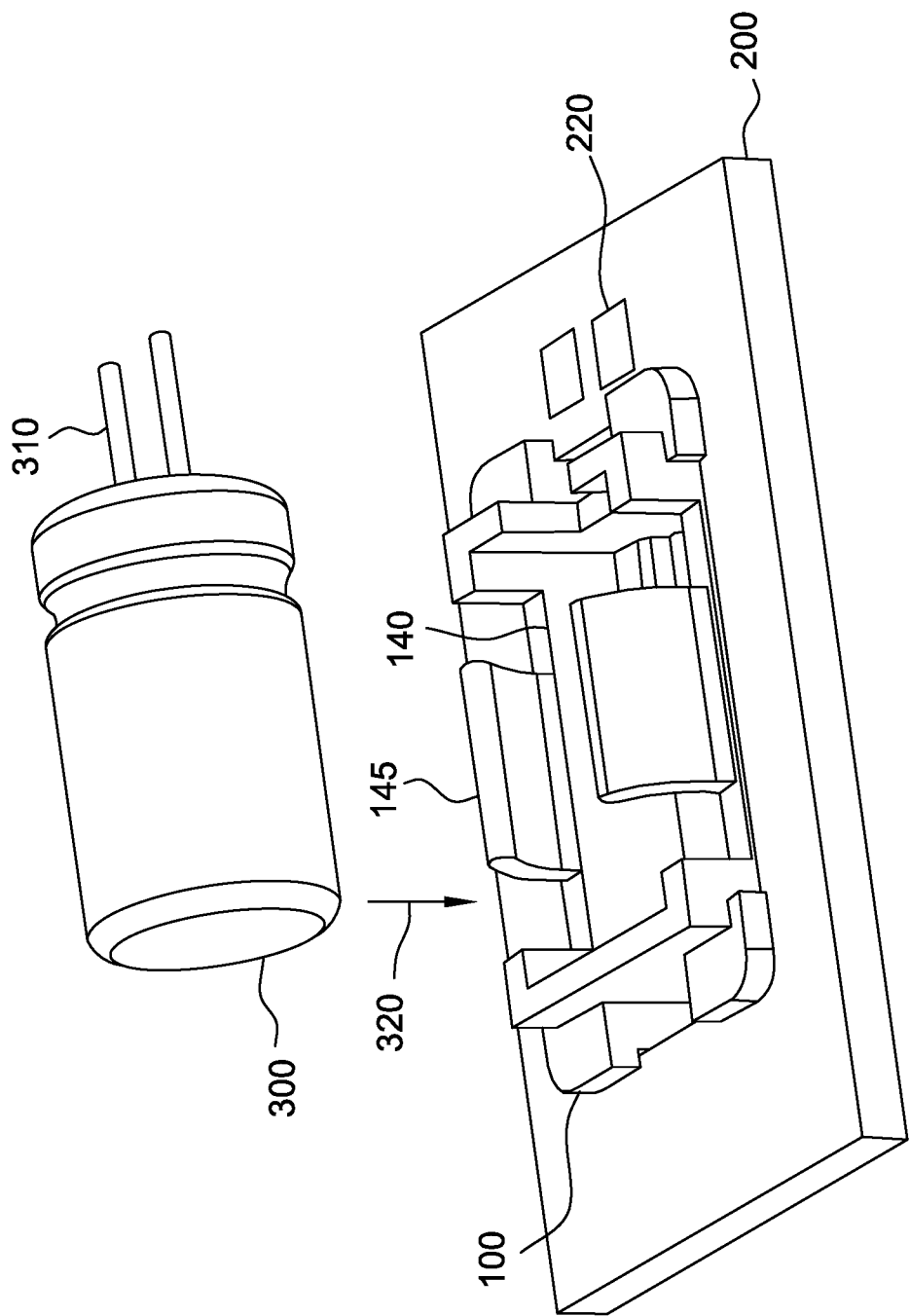
FIG. 3A illustrates a capacitor being placed into an opening of the bracket of FIG. 1 according to an example.

FIG. 3A illustrates a capacitor 300 being placed into an opening 140 of the bracket 100 of FIG. 1 according to an example. In an example, the capacitor 300 is horizontally disposed within the bracket 100. The capacitor 300 may be an electrolytic capacitor. However, it is contemplated that other capacitors may be placed within the opening 140 defined by the bracket 100. As such, the bracket 100 may have any number of different dimensions based, at least in part, on a type of capacitor that will be placed in the bracket 100.

In an example, the capacitor 300 includes one or more leads 310. The leads 310 may extend from a distal end of the capacitor 300 and may be electrically coupled to the pads 220 using a soldering process (e.g., a hot bar soldering process) when the capacitor 310 is placed within the opening 140.

The capacitor 300 may be positioned horizontally with respect to the bracket 100 and/or the substrate 200 and move toward the bracket 100 in the direction of the arrow 320. When the capacitor 300 contacts one or more ridges 145 of the bracket 100, the one or more ridges 145 may expand and/or move backward (e.g., away from ridges 145 on an opposite side of the opening 140) to allow the capacitor 300 to be received within the opening 140. Once the capacitor 300 is received within the opening 140, the capacitor 300 may rest or otherwise contact one or more shelves (e.g., shelves 150 (FIG. 1B)) positioned within the opening 140. Once the capacitor 300 has been received within the opening 140, the one or more ridges 145 may contract to secure the capacitor 300 within the opening 140.

While FIG. 3A illustrates the capacitor 300 being positioned within the bracket 100 after the bracket 100 has been vertically mounted to the substrate 200, it is contemplated that the capacitor 300 may be placed horizontally within the opening 140 of the bracket 100 prior to the bracket 100 being vertically coupled to the substrate 200. Once the capacitor 300 is placed within the opening 140 of the bracket 100, the bracket 100 may be vertically mounted to the substrate 200.

Figure 3B:
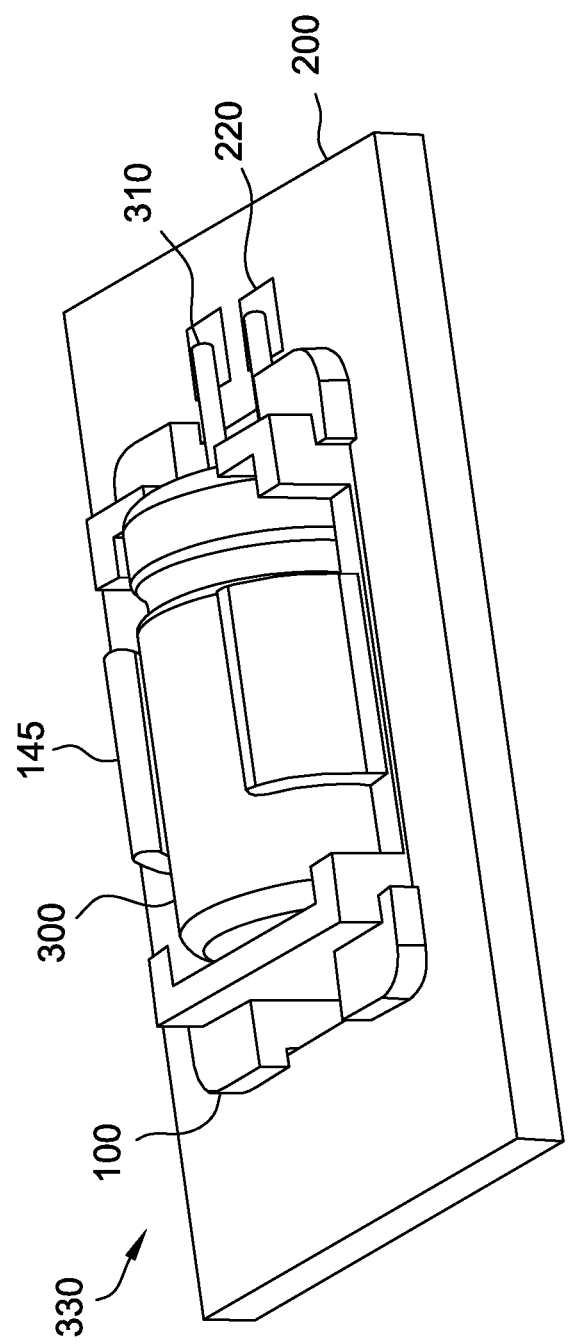
FIG. 3B illustrates a semiconductor package that includes the capacitor of FIG. 3A, the bracket of FIG. 1 and the substrate of FIG. 2 according to an example.

FIG. 3B illustrates a semiconductor package 330 that includes the capacitor 300 of FIG. 3A, the bracket 100 of FIG. 1 and the substrate 200 of FIG. 2 according to an example. In this example, the one or more leads 310 of the capacitor 300 extend through an aperture (e.g., aperture 155 (FIG. 1)) provided on a distal wall (e.g., distal wall 120 (FIG. 1)) of the bracket 100. The one or more leads 310 are then coupled to the one or more pads 220 of the substrate 200. In an example, the one or more leads 310 of the capacitor 300 are coupled to the one or more pads 220 of the substrate 200 using a hot bar soldering process or another soldering process.

Examples the present disclosure describe a bracket for mounting a capacitor to a substrate, comprising: a first sidewall; a second sidewall opposite the first sidewall; a proximal wall extending between a proximal end of the first sidewall and a proximal end of the second sidewall; a distal wall extending between a distal end of the first sidewall and a distal end of the second sidewall, the first sidewall, the second sidewall, the proximal wall and the distal wall defining an opening; a first flange extending from the proximal wall and forming a first ledge that contacts a surface of the substrate when the bracket is received in an opening defined by the substrate; a second flange extending from the distal wall and forming a second ledge that contacts the surface of the substrate when the bracket is received in the opening defined by the substrate; a first snap fit fastener extending from the proximal wall; and a second snap fit fastener extending from the distal wall. In an example, the first snap fit fastener is a v-shaped snap fit fastener. In an example, at least a portion of the v-shaped snap fit fastener extends below a bottom surface of the bracket. In an example, a top surface of the first snap fit fastener contacts a bottom surface of the substrate when the bracket is received in the opening defined by the substrate. In an example, the bracket also includes a rounded edge extending between the first sidewall and a bottom surface of the bracket. In an example, the bracket also includes an aperture defined by the proximal wall, the aperture receiving a lead of the capacitor when the capacitor is placed in the opening. In an example, the bracket also includes a first shelf provided on an inner portion of the first sidewall and a second shelf provided on an inner portion of the second sidewall, each of the first shelf and the second shelf supporting the capacitor when the capacitor is received in the opening. In an example, the bracket also includes a first ridge extending from a top surface of the first sidewall and a second ridge extending from a top surface of the second sidewall.

Examples also describe a semiconductor package, comprising: a substrate defining an opening; a bracket for a capacitor provided within the opening, the bracket comprising: a first sidewall; a second sidewall; a proximal wall extending between a proximal end of the first sidewall and a proximal end of the second sidewall; a distal wall extending between a distal end of the first sidewall and a distal end of the second sidewall, the first sidewall, the second sidewall, the proximal wall and the distal wall defining a bracket opening; a first flange extending from the proximal wall and forming a first ledge that contacts a surface of the substrate when the bracket is received in the opening defined by the substrate; a second flange extending from the distal wall and forming a second ledge that contacts the surface of the substrate when the bracket is received in the opening defined by the substrate; and a first snap fit fastener extending from the proximal wall; and a second snap fit fastener extending from the distal wall. In an example, the semiconductor package also includes an electrolytic capacitor positioned within the bracket opening. In an example, the first snap fit fastener is a v-shaped snap fit fastener. In an example, at least a first portion of the first snap fit fastener is rounded and enables a second portion of the first snap fit fastener to move from a first position toward a second position when the second portion of the first snap fit fastener contacts an edge of the substrate within the opening defined by the substrate. In an example, a top surface of the first snap fit fastener contacts a bottom surface of the substrate when the bracket is received in the opening defined by the substrate. In an example, the semiconductor package also includes a rounded edge extending between the first sidewall and a bottom surface of the bracket. In an example, the semiconductor package also includes an aperture defined by the proximal wall, the aperture receiving a lead of a capacitor when the capacitor is placed in the bracket opening. In an example, the semiconductor package also includes a first shelf provided on an inner portion of the first sidewall and a second shelf provided on an inner portion of the second sidewall, each of the first shelf and the second shelf supporting a capacitor when the capacitor is received in the opening. In an example, the semiconductor package also includes a first ridge extending from a top surface of the first sidewall and a second ridge extending from a top surface of the second sidewall. In an example, the semiconductor package also includes one or more pads provided on a surface of the substrate proximate to the opening.

Examples of the present disclosure also describe a bracket for mounting a capacitor to a substrate, comprising: a body defining a bracket opening; a first support means provided on a proximal end of the body; a second support means provided on a distal end of the body, the first support means and the second support means contacting a top surface of the substrate when the bracket is placed in an opening defined by the substrate; and a fastening means for securing the bracket within the opening defined by the substrate, the fastening means including a surface that contacts a bottom surface of the substrate when the bracket is placed in the opening defined by the substrate. In an example, the bracket also includes a support means provided within the bracket opening, the support means for supporting an electrolytic capacitor when the electrolytic capacitor is positioned within the bracket opening.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A bracket for mounting a capacitor to a substrate, comprising:
   a first sidewall;
   a second sidewall opposite the first sidewall;
   a proximal wall extending between a proximal end of the first sidewall and a proximal end of the second sidewall;
   a distal wall extending between a distal end of the first sidewall and a distal end of the second sidewall, the first sidewall, the second sidewall, the proximal wall and the distal wall defining an opening;
   a first flange extending from the proximal wall and forming a first ledge that contacts a surface of the substrate when the bracket is received in an opening defined by the substrate;
   a second flange extending from the distal wall and forming a second ledge that contacts the surface of the substrate when the bracket is received in the opening defined by the substrate;
   a first snap fit fastener extending from the proximal wall; and
   a second snap fit fastener extending from the distal wall.

2. The bracket of claim 1, wherein the first snap fit fastener is a v-shaped snap fit fastener.

3. The bracket of claim 2, wherein at least a portion of the v-shaped snap fit fastener extends below a bottom surface of the bracket.

4. The bracket of claim 1, wherein a top surface of the first snap fit fastener contacts a bottom surface of the substrate when the bracket is received in the opening defined by the substrate.

5. The bracket of claim 1, further comprising a rounded edge extending between the first sidewall and a bottom surface of the bracket.

6. The bracket of claim 1, further comprising an aperture defined by the proximal wall, the aperture receiving a lead of the capacitor when the capacitor is placed in the opening.

7. The bracket of claim 1, further comprising a first shelf provided on an inner portion of the first sidewall and a second shelf provided on an inner portion of the second sidewall, each of the first shelf and the second shelf supporting the capacitor when the capacitor is received in the opening.

8. The bracket of claim 1, further comprising a first ridge extending from a top surface of the first sidewall and a second ridge extending from a top surface of the second sidewall.

9. A semiconductor package, comprising:
   a substrate defining an opening;
   a bracket for a capacitor provided within the opening, the bracket comprising:
      a first sidewall;
      a second sidewall;
      a proximal wall extending between a proximal end of the first sidewall and a proximal end of the second sidewall;
      a distal wall extending between a distal end of the first sidewall and a distal end of the second sidewall, the first sidewall, the second sidewall, the proximal wall and the distal wall defining a bracket opening;
      a first flange extending from the proximal wall and forming a first ledge that contacts a surface of the substrate when the bracket is received in the opening defined by the substrate;
      a second flange extending from the distal wall and forming a second ledge that contacts the surface of the substrate when the bracket is received in the opening defined by the substrate; and
      a first snap fit fastener extending from the proximal wall; and
      a second snap fit fastener extending from the distal wall.

10. The semiconductor package of claim 9, further comprising an electrolytic capacitor positioned within the bracket opening.

11. The semiconductor package of claim 9, wherein the first snap fit fastener is a v-shaped snap fit fastener.

12. The semiconductor package of claim 9, wherein at least a first portion of the first snap fit fastener is rounded and enables a second portion of the first snap fit fastener to move from a first position toward a second position when the second portion of the first snap fit fastener contacts an edge of the substrate within the opening defined by the substrate.

13. The semiconductor package of claim 9, wherein a top surface of the first snap fit fastener contacts a bottom surface of the substrate when the bracket is received in the opening defined by the substrate.

14. The semiconductor package of claim 9, further comprising a rounded edge extending between the first sidewall and a bottom surface of the bracket.

15. The semiconductor package of claim 9, further comprising an aperture defined by the proximal wall, the aperture receiving a lead of a capacitor when the capacitor is placed in the bracket opening.

16. The semiconductor package of claim 9, further comprising a first shelf provided on an inner portion of the first sidewall and a second shelf provided on an inner portion of the second sidewall, each of the first shelf and the second shelf supporting a capacitor when the capacitor is received in the opening.

17. The semiconductor package of claim 9, further comprising a first ridge extending from a top surface of the first sidewall and a second ridge extending from a top surface of the second sidewall.

18. The semiconductor package of claim 9, further comprising one or more pads provided on a surface of the substrate proximate to the opening.

19. A bracket for mounting a capacitor to a substrate, comprising:
   a body comprising a first sidewall, a second sidewall, a third sidewall and a fourth sidewall and defining a bracket opening;
   a first support means provided on a proximal end of the body;
   a second support means provided on a distal end of the body, the first support means and the second support means contacting a top surface of the substrate when the bracket is placed in an opening defined by the substrate; and
   a fastening means for securing the bracket within the opening defined by the substrate, the fastening means including a surface that contacts a bottom surface of the substrate when the bracket is placed in the opening defined by the substrate.

20. The bracket of claim 19, further comprising a support means provided within the bracket opening, the support means supporting an electrolytic capacitor when the electrolytic capacitor is positioned within the bracket opening.

\* \* \* \* \*